(12) United States Patent
Su et al.

(10) Patent No.: US 9,040,604 B2
(45) Date of Patent: May 26, 2015

(54) MULTIFUNCTIONAL HYPERBRANCHED ORGANIC INTERCALATING AGENT, METHOD FOR ITS MANUFACTURE AND ITS USE

(71) Applicant: Chung-Shan Institute of Science and Technology, Armaments Bureau, M.N.D, Taoyuan County (TW)

(72) Inventors: Wen-Chiung Su, Taoyuan County (TW); Ru-Jong Jeng, Taoyuan County (TW); Tzong-Yuan Juang, Taoyuan County (TW); Shi-Min Shau, Taoyuan County (TW); Guan-Liang Chen, Taoyuan County (TW); Han-Sheng Lin, Taoyuan County (TW)

(73) Assignee: CHUNG SHAN INSTITUTE OF SCIENCE AND TECHNOLOGY, ARMAMENTS BUREAU, M. N. D, Taoyuan County (TW)

(*) Notice: Subject to any disclaimer, the term of this patent is extended or adjusted under 35 U.S.C. 154(b) by 97 days.

(21) Appl. No.: 13/714,150

(22) Filed: Dec. 13, 2012

(65) Prior Publication Data

US 2014/0171590 A1 Jun. 19, 2014

(51) Int. Cl.
| | |
|---|---|
| C08K 9/04 | (2006.01) |
| C08G 73/10 | (2006.01) |
| C04B 20/06 | (2006.01) |
| C08G 69/40 | (2006.01) |
| C08K 3/20 | (2006.01) |
| C08K 9/12 | (2006.01) |

(52) U.S. Cl.
CPC . *C08G 69/40* (2013.01); *C08K 3/20* (2013.01); *C08G 73/1032* (2013.01); *C08K 9/12* (2013.01); *C08G 73/1046* (2013.01); *C08K 9/04* (2013.01)

(58) Field of Classification Search
CPC .............. C08K 3/20; C08K 9/04; C08K 9/12; C08G 73/1032; C08G 73/1046
USPC ................ 523/205; 528/289, 499; 252/378 R
See application file for complete search history.

(56) References Cited

U.S. PATENT DOCUMENTS

| | | | | |
|---|---|---|---|---|
| 5,411,829 | A * | 5/1995 | Sacripante et al. | 430/109.5 |
| 7,022,299 | B2 * | 4/2006 | Lin et al. | 523/216 |
| 7,166,657 | B2 * | 1/2007 | Rao et al. | 523/216 |
| 2014/0011905 | A1 * | 1/2014 | Kyung et al. | 522/164 |

* cited by examiner

*Primary Examiner* — Tae H Yoon
(74) *Attorney, Agent, or Firm* — Chun-Ming Shih (57) ABSTRACT

A facile synthesis of amphiphilic hyperbranched polymers consisting of poly(amic acid) and polyimide was developed via "$A_2+B_3$" approach from difunctional anhydride and trifunctional hydrophilic poly(oxyalkylene)triamine. Various amphiphilic hyperbranched poly(amic acid)s (HBPAAs) with terminal amine functionalities and amic acid structures were prepared through ring-opening polyaddition at room temperature, followed by thermal imidization process for the formation of hyperbranched polyimides (HBPIs), accordingly. The resulting HBPIs were analyzed by GPC, indicating the molecule weights of 5000~7000 g/mol with a distribution of polydispersity between 2.0 and 3.8. The amine titration for HBPIs indicated the peripheral total-amine contents to be 8.32~18.32 mequiv/g dependent on compositions.

9 Claims, 8 Drawing Sheets
(7 of 8 Drawing Sheet(s) Filed in Color)

FIG. 1

(a) pH=3 ; HBPAA11, (b) pH=10 ; HBPAA11 (1mg HBPAA /10 mL $H_2O$)
(b) pH=3 ; HBPI11, (b) pH=10 ; HBPI11 (1mg HBPI /10 mL $H_2O$)

(a) HBPAA11

(b) HBPI11

FIG. 5

(a) pristine GO (b) GO/HBPI11=1:7

(c) GO/HBPAA11=1:5

FIG. 6

(a) GO/HBPAA23 = 1:1 (intercalated GO)

(b) GO/HBPAA23 = 1:5 (exfoliated GO)

(c) magnified view of the image in (b)

MULTIFUNCTIONAL HYPERBRANCHED ORGANIC INTERCALATING AGENT, METHOD FOR ITS MANUFACTURE AND ITS USE

FIELD OF THE INVENTION

The present invention is related to a multifunctional hyperbranched organic intercalating agent and method for its manufacture, especially to an amphiphilic hyperbranched intercalating agent that is able to form micelles under various acidic or alkaline conditions to emit fluorescence and to completely exfoliate graphite oxide through direct molecular exfoliation with amphiphilic hyperbranched polymers.

The present invention is also related to a direct molecular exfoliation method for manufacturing an intercalated two-dimensional (2D) layered material using said multifunctional hyperbranched organic intercalating agent and related to the intercalated 2D layered material.

The present invention is further related to a use of the multifunctional hyperbranched organic intercalating agent.

BACKGROUND OF THE INVENTION

Toyota technical center in Japan published a dispersed clay/polyimide (nylon) nanocomposites, which can be distinguished from traditional clay/polymer composites. The clay/polymer composites with a character—nano-scale dispersion have to overcome the compatibility between hydrophilic polymeric substrates and hydrophobic polymeric substrates. Therefore, modification of a 2D layered material is of importance for the application of the 2D layered material. For example, TW patent No. I230181 discloses a method for manufacturing waterborne polyurethane/clay nanocomposites, which includes modifying layered clay with C6 to C18 diamine, then pre-polymerizing the layered clay being modified with waterborne polyurethane to form a stable dispersion (i.e. waterborne polyurethane/clay nanocomposite) after chain elongation. TW patent No. I230181 discloses a method for manufacturing modified clay, polyurethane/clay nanocomposites, which includes using a hydrophobic modifier and a reactive modifier (with —OH and —NH functional groups). The reactive modifier has a functional group that is able to react with polyurethane.

Other literatures reported an intercalating agent for layered silicate clay includes amine, such as 12-aminoluric acid, hexadecylamine, fatty amine, bis(2-hydroxyethyl)methyl tallow alkyl ammonium chloride, stearylamine or the like, or quaternary ammonium salt. Such intercalating agent has polar ammonium functional groups being able to ion exchange with ionic molecules between layers and to alter the hydrophilicity of clay to organic solvent-philicity in order to increase the affinity of clay layered platelets to organic monomers or polymers, which is beneficial for further compatibility, intercalation and exfoliation. For example, Prior art discloses a method for manufacturing modified organic layered composites. It indicates that novel modified organic layered composites formed with an intercalating agent for modification of layered materials, which has superior interaction with most polymeric materials to form exfoliated composites. Another prior art reported that the length of alkylamine salt intercalating agent is related to interlayered spacing. Suitable spacing between layers allows accessibility of epoxy resin monomers for polymerization to further disperse layered inorganic materials such that those materials perform as nanomaterials. Another prior art also control interlayered spacing between clay layers between 20 Å and 92 Å by changing the molecular weight of polypropylene ether amines (MW 230~5000), hydrophilic/hydrophobic interaction, branched structure of molecules and the ratio of quaternary amine. Through critical conformation change mechanism, it can be summarized that the interlayered spacing is positively related to the molecular length of the intercalating agent. Therefore, the change of molecular weight, number of functional groups or properties of intercalating agent is able to further provide 2D layered material different dispersed forms and configurations for specific effective applications. For example, Another prior art disclose methods for manufacturing amine terminal-Mannich oligomer and amine-terminating epoxy oligomers, which include using an intercalating agent and layered silicate inorganic clay to conduct an intercalation in acidic conditions and to further achieve exfoliation by controlling the acidation, which improves mechanical property, transparency, thermal property and the like of the composite. Another prior art provides an olilgoaniline exfoliating agent, exfoliated platelet-shaped clay comprising the exfoliating agent and preparation thereof. Furthermore, Another prior art provides multi-functional hyperbranched organic polyamines formed by polymerizing poly(oxypropylene)-triamine and diglycidyl ether of bisphenol-A (DGEBA). The exfoliating agent directly exfoliates inorganic clay, such as montmorillonite, mica and so on, through intercalation and exchange reaction, which becomes random form of nanosilicate platelets as antibacterial materials through ion exchange extraction. US publication No. 20100190905 also provides a hyperbranched polymer modifier for clay composite, which has an average molecular weight of 200~30000, also includes 5~300 hydroxyl groups and 0~100 carbonyl groups and has an interlayered spacing being up to 3~20 nm, which improve the compatibility between clay and polymers.

BRIEF DESCRIPTION OF THE INVENTION

The present invention provides a method for manufacturing a novel amphiphilic hyperbranched polymer as a modified organic intercalating agent that can be used to intercalate 2D layered materials and to further form disordered exfoliated hybrid materials. The present invention is especially related to an individual graphene platelets forming 2D nanohybrid material through direct molecular exfoliation with amphiphilic hyperbranched polymers. The intercalating agent is formed by polymerization of poly(oxypropylene) triamine and difunctional di-anhydride. The intercalating agent has amic acids, amides and plentiful peripheral amino groups, forms micelle in different acidic or alkaline conditions and emits fluoresce. With plentiful functional groups and structure of the intercalating agent, graphite oxide can be completely exfoliated and the intercalating agent can be used for exfoliation of other 2D layered materials including cation-incorporated hydrotalcites, anionic clay and organic modified layered graphite carbon-materials.

In one aspect, the present invention aims to provide a multi-functional, hyperbranched organic intercalating agent and a direct molecular exfoliation method for manufacturing thereof.

Therefore, a method for manufacturing a multi-functional, hyperbranched organic intercalating agent of the present invention comprises synthesizing hydropholic triamine with polyoxyalkylene segmented chains and difunctional di-anhydride to form an $A_2B_3$ type of hyperbranched polymeric intercalating agent with poly(amic acid) and polyimide.

Preferably, the hydropholic triamine is poly(oxypropylene)triamine represented by the following formula:

wherein a=4~5, 16~17 or 27~28.

Commercially available hydropholic triamine comprises Jeffamine® T-403, T-3000 or T-5000.

The difunctional di-anhydride is selected from the group consisting of 4,4'-oxydiphthalic dianhydride (ODPA), pyromellitic dianhydride (PMDA), 3,3',4,4'-Benzophenone tetracarboxilic dianhydride (BTDA), 3,3',4,4'-Biphenyl tetracarboxylic dianhydride (BPDA) and hexafluoroisopropylidene diphthalic dianhydride (6FDA). Said 4,4'-oxydiphthalic dianhydride (ODPA) is represented by the following formula:

In the synthetic reaction, the molar ratio of the hydropholic triamine and the difunctional di-anhydride is from 0.7:1 to 2:1.

The hydropholic triamine and the difunctional di-anhydride are synthesized at a temperature below room temperature to avoid rapid reaction leading to gelatination. Preferred synthesis is conducted at a temperature under 0° C. and with a low feed rate. The total concentration of the hydropholic triamine and the difunctional di-anhydride in a solvent during synthesis is from 0.05 M to 0.09 M.

Preferably, before being synthesized with the hydropholic triamine, the difunctional di-anhydride is pretreated for lowering degree of hydrolysis. The pretreatment comprises using thermal cyclization (such as heating the difunctional di-anhydride at 170° C. in a vacuum for 6 hours) or chemical imidization (such as reacting pyridine as catalyst with acetic anhydride as dehydration reagent for imidization and then removing them in a vacuum).

Synthesizing the hydropholic triamine and difunctional di-anhydride is conducted in a solvent and the solvent is anhydrous N,N-Dimethylacetamide (DMAc).

The method of the present invention further comprises removing a solvent after the synthetic step, which includes primarily removing solvent by distillation at reduced pressure and removing residual solvent from the intercalating agent by drying the intercalating agent at 60° C. for 24 hours in a vacuum oven. The obtained $A_2B_3$ type of hyperbranched polymeric intercalating agent is hyperbranched poly(amic acid) (HBPAA) in orange color.

The method of the present invention further comprises removing a solvent after the synthetic step, which includes conducting thermal imidization by rising a synthetic temperature to 150° C. with nitrogen to conduct a backflow reaction for 24 hours, then primarily removing solvent by distillation at reduced pressure and removing residual solvent from the intercalating agent by drying the intercalating agent at 60° C. for 6 hours in a vacuum oven. The obtained $A_2B_3$ type of hyperbranched polymeric intercalating agent is hyperbranched polyimide (HBPI) in dark yellow color.

The present invention also provides an intercalating agent manufactured by the aforementioned method.

The intercalating agent has amine ($NH_2$) equivalents determined by amine titration, which are between 8.32 mequiv/g and 18.32 mequiv/g; GPC molecular weight ($M_w$) between 5000 g/mol and 7000 g/mol; and polydispersity index (PDI) between 2.0 and 3.8.

The intercalating agent is able to form micelles with particle size between 5 and 400 in different conditions (pH values).

In another aspect, the present invention aims to provide a direct molecular exfoliation method for modifying a 2D layered material by using the aforementioned multifunctional hyperbranched organic intercalating agent. The intercalating agent synthesized by the hydropholic triamine with polyoxyalkylene segmented chains and the difunctional di-anhydride is able to intercalating the 2D layered materials when it mixes with the 2D layered materials. When the intercalating agent and the 2D layered materials are mixed with a specific ratio, the 2D layered materials can be exfoliated to form disordered and dispersed exfoliated hybrid materials.

Therefore, a method for a modifying 2D layered material by intercalating agent of the present invention comprises neutralizing the intercalating agent with an inorganic acid or inorganic base leading to ionization to form an ionized amphiphilic hyperbranched organic polymer; allowing the ionized amphiphilic hyperbranched organic polymer to form micelles in an aqueous phase; and mixing the ionized amphiphilic hyperbranched organic polymer and an untreated 2D layered material for intercalation to obtain a modified 2D layered material.

Said inorganic acid may be hydrochloric acid, nitric acid, phosphoric acid, sulfuric acid or any acid with the same effect. Said inorganic base may be hydroxide or chloride of alkali metals or alkaline earth metals or any base with the same effect.

Said ionized amphiphilic hyperbranched organic polymer has specific number of ionized functional groups, chemical bonding, sizes of molecules or the like, which can be adjusted according to materials to be intercalated to achieve specific effects.

The molar ratio of the untreated 2D layered material and the ionized amphiphilic hyperbranched organic polymer is from 1:1 to 1:9.

The ionized amphiphilic hyperbranched organic polymer is mixed with the untreated 2D layered material in an aprotic polar hydrophilic co-solvent that can be N,N-dimethylacetamide (DMAc), dimethylfomamide (DMF), dimethylsulfoxide (DMSO), 1-methyl-2-pyrrolidone (NMP) or the like.

The untreated 2D layered material can be graphite oxide, graphene oxide, montmorillonite, mica, kaolinite, vermiculite, layered double hydroxides (LDHs) or any 2D layered materials that can be exfoliated. Preferred 2D layered material is graphite oxide, montmorillonite or layered double hydroxide.

The graphite oxide is obtained by oxidation of high purity graphite powders as raw materials according to the Hummers-Offeman method.

Furthermore, based on the experimental results, when the hyperbranched poly(amic acid) (HBPAA) of the present invention intercalates the graphite oxide in a weight ratio of 1:3, the graphite oxide can effectively achieve disordered exfoliation. When the hyperbranched polyimide (HBPI) of the present invention intercalates the graphite oxide in a weight ratio of 1:7, the graphite oxide can effectively achieve disordered exfoliation.

The disordered exfoliated 2D layered materials, such as graphene oxide, can be reduced to monolayered graphene through conventional effective reducing methods as reported in literatures such as *Nanoscale*, 2011, 3, 3132. or *J. Phys. Chem. C* 2011, 115, 11327. The 2D layered materials can be applied as thermal or electrical conductive materials including electrodes, electronic components, transistors, conductive films, materials for lithium batteries, ultracapacitors, composites and the like for the preparation of electrochemical cells, fuel cells, flexible substrates, display panels, solar panels and other photo-electric products.

The present invention also provides a modified 2D layered material manufactured by the aforementioned method.

In yet another aspect, the present invention further aims to provide use of the multifunctional hyperbranched organic intercalating agent in a nanocapsule, molecular self-assembly, drug carrier or drug tracer since the multifunctional hyperbranched organic intercalating agent is able to form nanomicelles in different acidic and alkaline conditions and emit fluorescence in alkaline conditions.

Therefore, a use of the multifunctional hyperbranched organic intercalating agent of the present invention comprises the use of the multifunctional hyperbranched organic intercalating agent in a nanocapsule, molecular self-assembly, drug carrier or drug tracer, wherein the multifunctional hyperbranched organic intercalating agent forms nanomicelles with particle size between 5 nm and 400 nm in acidic or alkaline conditions.

The multifunctional hyperbranched organic intercalating agent of the present invention is able to effectively form nanomicelles in different conditions (either acidic or alkaline condition) and can be observed to emit fluorescence (with absorption wavelength of approximately 360 nm) in alkaline condition. Preferred multifunctional hyperbranched organic intercalating agent is hyperbranched polyamic acid (HB-PAA). Due to its plentiful functional groups and special molecular structure, the multifunctional hyperbranched organic intercalating agent can be used as a nanocapsule, molecular self-assembly, drug carrier or drug tracer.

BRIEF DESCRIPTION OF THE DRAWINGS

The file of this application contains drawings executed in color.

DETAILED DESCRIPTION OF THE INVENTION

Definition

"2D layered material" is the material such as montmorillonite, synthetic fluorinated mica, layered double hydroxides (LDHs) and the like, which can be ion exchanged through an inorganic intercalating agent allowing monomers to flow in or out, such that the interlayered spacing can be increased from 10 Å to approximately 20~30 Å.

"Intercalation" indicates substances dispersed regularly between layers that are separated by a specific spacing, which means organic molecules intercalate between layers to avoid the interaction between layers and restacking behavior.

"Exfoliation" indicates that every single layer exists in an irregular distance and orientation. It can be normally achieved by an organic intercalating agent to increase the interlayered spacing to a specific extent, which increases the affinity between inorganic layers and the organic polymer and then the organic/inorganic polymeric nanocomposites can be obtained through polymerization, compounding technology or re-dispersion mechanism.

"$A_2$" in "$A_2B_3$ type" indicates difunctional anhydride while "$B_3$" in "$A_2B_3$ type" indicates trifunctional hydrophilic poly(oxyalkylene)triamine with polyoxyalkylene segmented chains.

EXAMPLES

The following examples present preferred embodiments illustrating the method for manufacturing the multifunctional hyperbranched organic intercalating agent of the present invention and compare operational conditions and results of examples of the present invention with those of conventional examples.

Raw materials used in the examples of the present invention and conventional examples comprise: (1) polypropylene glycol)diamine purchased from Huntsman Chemical Co. or Aldrich Chemical Co. (brand name: Jeffamine® T-403) with molecular weight of 440 and represented by the following formula wherein a=4~5.

The difunctional di-anhydride is 4,4'-Oxydiphthalic dianhydride (ODPA) represented by the following formula:

Example 1

Step (a): Synthesis of Multifunctional Hyperbranched Organic Intercalating Agent (Hyperbranched Poly(Amic Acid) and Hyperbranched Polyimide)

One-step synthesis was used. A 500 ml round bottom flask with two necks was used, which let nitrogen ($N_2$) flow in for 10 minutes. Triamine T-403 (7.09 g, 0.0161 mole) and pre-treated difunctional dianhydride ODPA (5 g, 0.0161 mole) were used in a molar ratio of 1:1 and the anhydrous N,N-dimethylacetamide (DMAc) was used as a solvent. Firstly, triamine and a portion of DMAc (100 ml) were added in the round bottom flask with two necks to be mixed in a room temperature. After the triamine was completely dissolved, difunctional dianhydride was dissolved in a portion of DMAc (260 ml) and then this solution was slowly dropped into the round bottom flask with two necks through a feed pipe to start a reaction that is conducted in an ice bath to avoid rapid reaction leading to gelatination. The total concentration of the hydropholic triamine and the difunctional di-anhydride in a solvent during synthesis is 0.09 M. Those materials in the round bottom flask with two necks were reacted for 2~3 hours after feeding to obtain hyperbranched poly(amic acid) polymeric solution, which is the multifunctional hyperbranched organici intercalating agent of the present invention.

The hyperbranched poly(amic acid) polymeric solution was halved. For one half, solvent was primarily removed by distillation at reduced pressure and residual solvent was removed from the intercalating agent by drying the intercalating agent at 60° C. for 6 hours in a vacuum oven. A product, hyperbranched poly(amic acid)-11 (HBPAA-11) in orange color, was obtained.

Step (b): Synthesis of 2D Layered Material—Graphite Oxide

High purity graphite powders were used as raw materials in the synthesis of graphite oxide. The particle size of the graphite powders is <20 μm, manufactured by Aldrich. The oxidation of the graphite oxide was performed according to Hummers-Offeman method (J. Am. Chem. Soc., 1958, 80, 1339.). 40 g of graphite powder and 50 g of sodium nitrate were mixed in 2300 ml of concentrated sulfuric acid, which was treated in an ice bath. Then, 300 g of potassium permanganate was slowly added and simultaneously agitation was performed to control the temperature lower than 20° C. The mixture was stirred at 35° C. for 30 minutes, then was diluted into 5200 ml with deionized water, and was stirred at 98° C. for 15 minutes. The reaction was terminated after adding 3 wt % of hydrogen peroxide and being stirred at 10° C. Deionized water was used to wash the mixture (sludge) for several times until the pH value of the deionized water after washing was close to 7.0. Finally, the sludge was dried in vacuum at a temperature of 100° C. for 48 hours to obtain modified graphite oxide powders.

Step (c): Intercalation of Hyperbranched Polymer/Graphite Oxide 1 g of graphite oxide was intercalated with HBPAA-11 in various ratios: 1/1、1/2、1/3、1/5、1/7 to 1/9 and so forth. 20 ml of DMAc was used as solvent. The hyperbranched polymer was dissolved in DMAc and suitable amount of neutral ions were added when the hyperbranched polymer was stirred in DMAc at room temperature, such that the hyperbranched polymer formed nanomicelles (5~400 nm). After the hyperbranched polymer was completely dissolved in DMAc, graphite oxide pre-swelled in hot water (20 ml of water) was added to be stirred and dispersed for 24 hours. Modified and dispersed slurry was filtered to remove solvent. Residual solvent was removed by drying the intercalating agent at 60° C. for 6 hours in a vacuum oven to obtain powdered product. The product was analyzed by FTIR, XRD, TEM, SEM and so forth.

Example 2

Step (a): The molar ratio of T-403 and ODPA was adjusted to 2:1 (The product is abbreviated as HBPAA-21).

Step (b): identical to example 1.

Step (c): identical to example 1 but the intercalating agent was HBPAA-21 shown in the step (a) of example 2.

Comparative Example 1

Step (a): The molar ratio of T-403 and ODPA was adjusted to 2.2:3 (The product is abbreviated as HBPAA-23).

Step (b): identical to example 1.

Step (c): identical to example 1 but the intercalating agent was HBPAA-21 shown in the step (a) of example 2

Comparative example 2 (Hyperbranched Polyimides (HBPI))

Step (a): Another half of hyperbranched polyamic acid manufactured in step (a) in each of example 1, example 2 and comparative example 1 was cyclized by thermal imidization. The temperature was raised to 150° C. for a backflow reaction for 24 hours with nitrogen. After maturation, most of solvent was removed by distillation at reduced pressure and residual solvent was removed by drying the intercalating agent at 60° C. for 6 hours in a vacuum oven. A product, hyperbranched polyimide-11 (HBPI-11, HBPI-21 and HBPI-23 respectively for example 1, example 2 and comparative example 1) in dark yellow color, was obtained.

Step (b): identical to example 1.

Step (c): identical to example 1 but the intercalating agent was HBPAA-21 shown in the step (a) of example 2.

Figure 1:
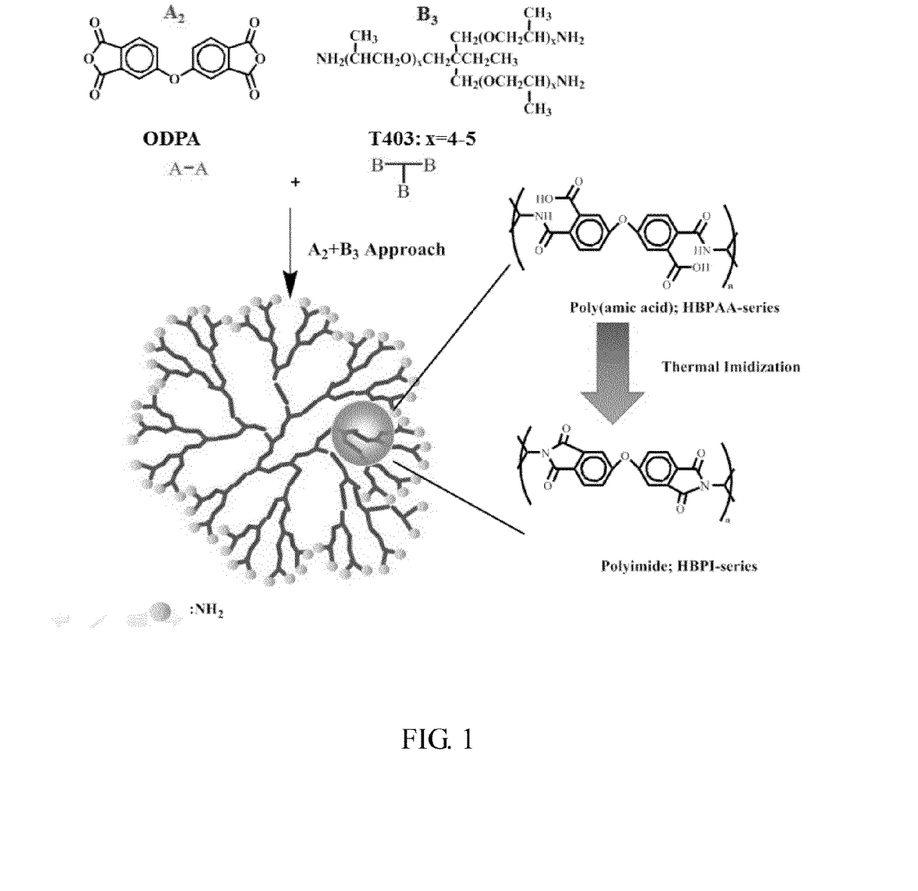
FIG. 1 is a diagram illustrating the synthesis of multifunctional hyperbranched organic intercalating agent of the present invention.

The hyperbranched polymeric intercalating agent of the present invention includes two types: hyperbranched poly (amic acid) (HBPAA) and hyperbranched polyimide (HBPI). FIG. 1 illustrates the structures of the hyperbranched polymers and their difference in functional groups. The ratio of raw materials, molecular weight and distribution of gel permeation chromatography (GPC), amine equivalent during titration and thermal properties of the examples and comparative examples are shown in Table 1.

TABLE 1

Properties of intercalating agents in examples:

| | Intercalating agent | composition (molar ratio) | Number of functional groups in ratio amide:anhydride | Thermal properties $T_d$ (° C.)[a] | $T_g$ (° C.)[b] | GPC molecular weight[c] $M_W$ | PDI | amine titration[d] (mequiv g$^{-1}$) |
|---|---|---|---|---|---|---|---|---|
| Example 1 | HBPAA11 | T403/ODPA (1:1) | 3:2 | 180 | — | 7520 | 4.1 | 18.2 |
| Comparative example 2 | HBPI11 | | | 220 | 162 | 6590 | 3.7 | 14.5 |

TABLE 1-continued

Properties of intercalating agents in examples:

| Intercalating agent | composition (molar ratio) | Number of functional groups in ratio amide:anhydride | Thermal properties $T_d$ (°C.)[a] | Thermal properties $T_g$ (°C.)[b] | GPC molecular weight[c] $M_W$ | GPC molecular weight[c] PDI | amine titration[d] (mequiv g$^{-1}$) |
|---|---|---|---|---|---|---|---|
| Example 2 | HBPAA21 | 6:2 | 167 | — | 8200 | 4.2 | 22.5 |
| Comparative example 2 | HBPI21 | T403/ODPA (2:1) | 203 | 150 | 7560 | 3.8 | 18.3 |
| Comparative example 1 | HBPAA23 | 6.6:6 | 182 | — | 5530 | 2.5 | 12.3 |
| Comparative example 2 | HBPI23 | T403/ODPA (2.2:3) | 195 | 123 | 5040 | 2.0 | 8.3 |

[a] Temperature at which 5% weight loss occurred during TGA (heating rate: 10° C. min$^{-1}$).
[b] Determined through DSC analysis under $N_2$.
[c] Determined through GPC analysis in THF (calibration: polystyrene standards); PDI = $M_w/M_n$.
[d] Amine titration value.

Figure 2:
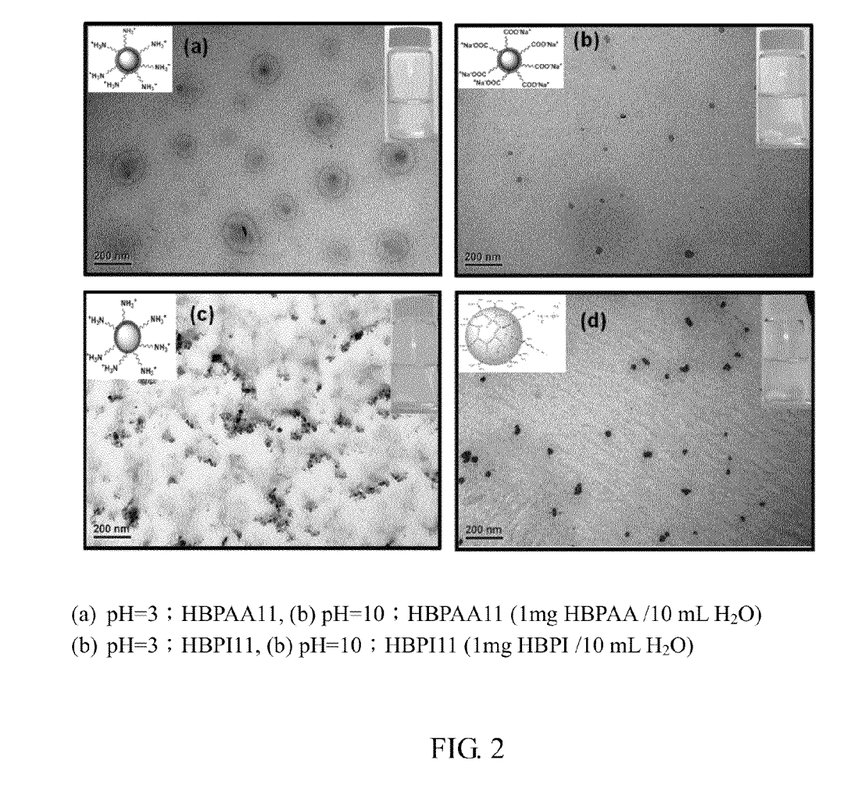
FIG. 2 shows transmission electron microscopy (TEM) images of hyperbranched polymeric micelles with schematic diagrams showing their structures.
Figure 3:
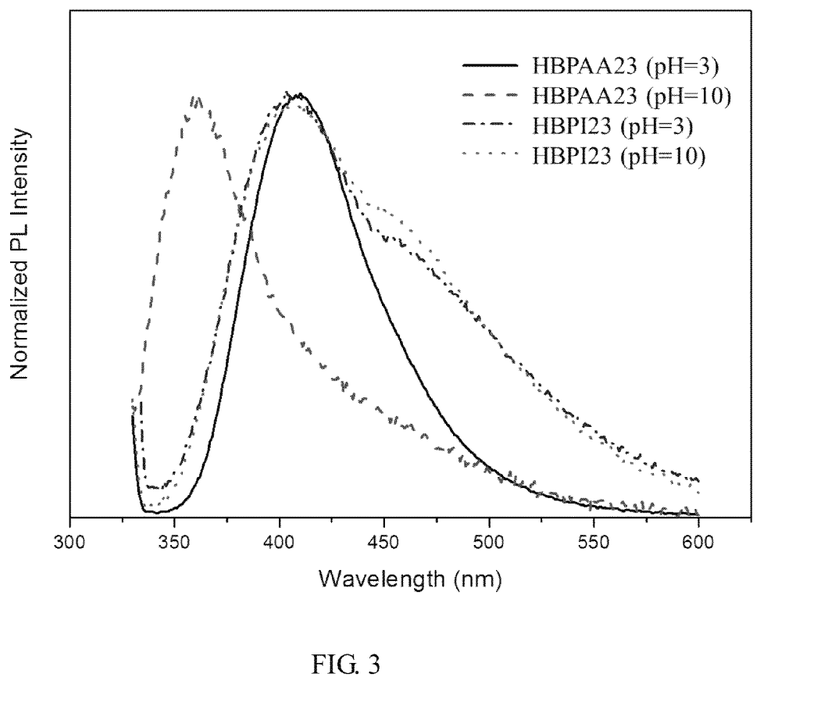
FIG. 3 is a fluorescence spectrum of a solution with amphiphilic hyperbranched polymeric micelles in different acidic and alkaline conditions.

FIG. 2 shows transmission electron microscopy (TEM) images of hyperbranched polymeric micelles. FIG. 3 is a fluorescence spectrum of the hyperbranched polymeric micelles. Fluorescence effect was observed in alkaline condition (absorption wavelength is about 360 nm), especially for hyperbranched poly(amic acid) (HBPAA).

Figure 4:
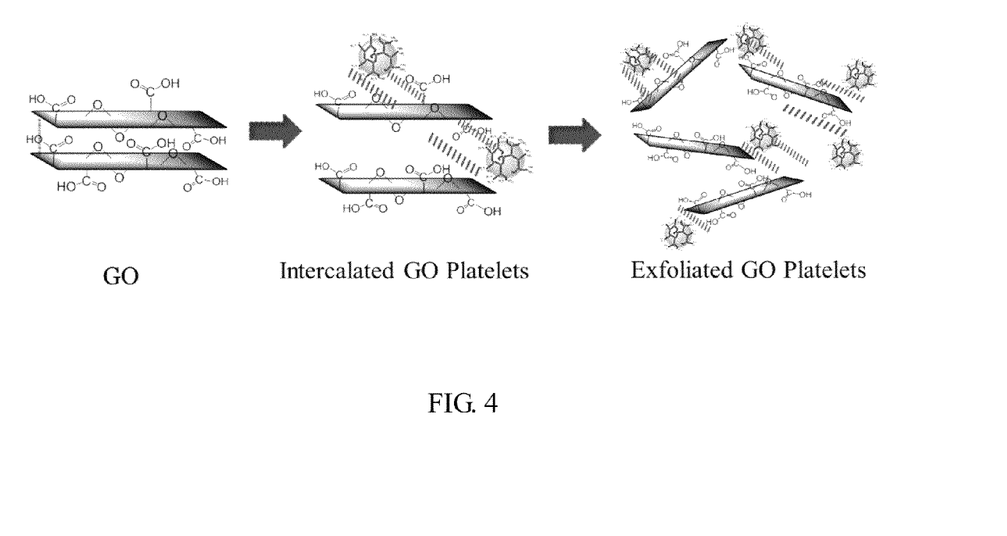
FIG. 4 is a flowchart illustrating the exfoliation of graphite oxide through the multifunctional hyperbranched organic intercalating agent of the present invention.

The amphiphilic hyperbranched polymeric micelles have amic acids, amides and plentiful peripheral amino groups. Disordered exfoliation of 2D layered material can be achieved by the organic intercalating agent through strong intra- and intermolecular hydrogen bonding, three-dimensional branched structure, amide bonding or imide bonding, neutralization of ionized functional groups and hydrophilic/hydrophobic interactions and so forth, especially for graphene oxide thin layer hybrids. The mechanism is shown in FIG. 4.

Figure 5:
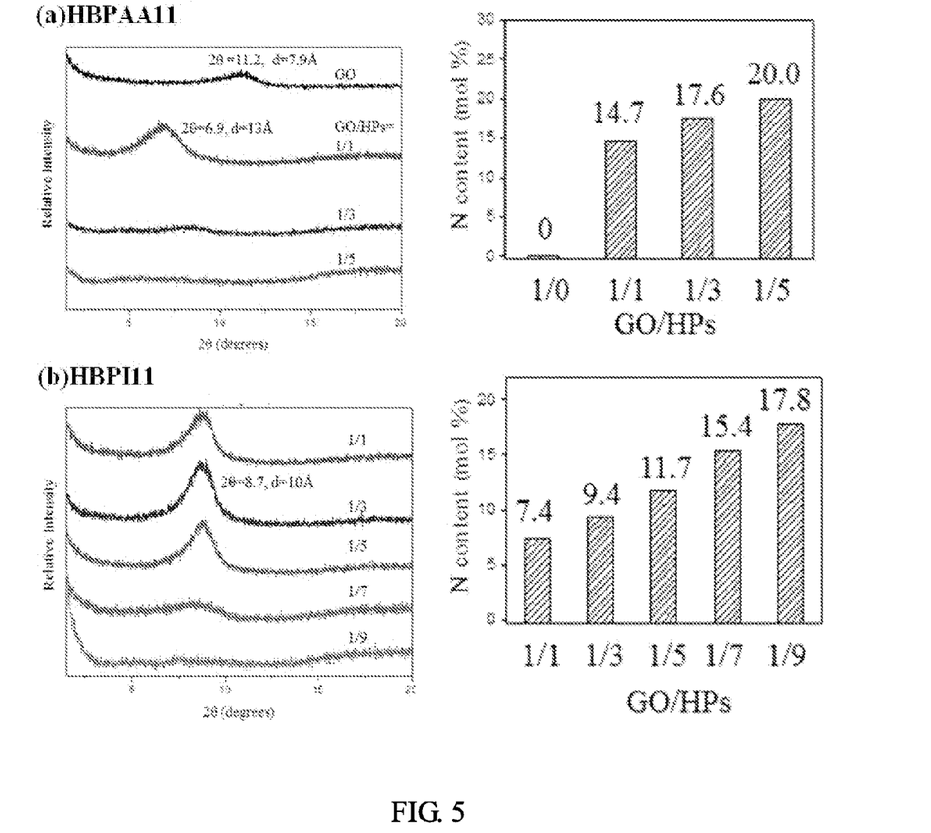
FIG. 5 shows x-ray diffraction (XRD) diagrams and charts regarding nitrogen content analysis.

With reference to table 2 and FIG. 5, they are related to the results of the intercalation and exfoliation in step (c) of each example, which were analyzed by x-ray Diffraction (XRD). Since graphite oxide has bountiful oxygen-containing functional groups on the surface, thermal analysis cannot determine the hybridization efficiency, nitrogen analysis was used to compare the results as shown in FIG. 5. At a specific ratio, XRD pattern was featureless, which means partial exfoliation or even disordered exfoliation was achieved.

TABLE 2

Results of the intercalation of graphite oxide by hyperbranched poly(amic acid) (HBPAA) and hyperbranched polyimide (HBPI)

| | hyperbranched poly(amic acid) intercalating agent | | | hyperbranched polyimide intercalating agent | | |
|---|---|---|---|---|---|---|
| graphite oxide/ intercalating agent (weight ratio) | Example 1 HBPAA11 | Example 2 HBPAA21 | Comparative example 1 HBPAA23 | Comparative example 2 HBPI11 | Comparative example 2 HBPI21 | Comparative example 2 HBPI23 |
| 1:1 | 13 Å | 15 Å | 16 Å | 10 Å | 9 Å | 10 Å |
| | | | (TEM: exfoliation) | | | |
| 1:3 | exfoliation[a] | exfoliation[a] | exfoliation[a] | 10 Å | 10 Å | 10 Å |
| 1:5 | exfoliation[a] | exfoliation[a] | exfoliation[a] | 10 Å | 11 Å | 10 Å |
| | (TEM: exfoliation) | (TEM: exfoliation) | | | | |
| 1:7 | | | | exfoliation[a] (TEM: exfoliation) | exfoliation[a] | exfoliation[a] |
| 1:9 | | | | exfoliation[a] | exfoliation[a] | exfoliation[a] |

[a] disordered XRD structure

Figure 6:
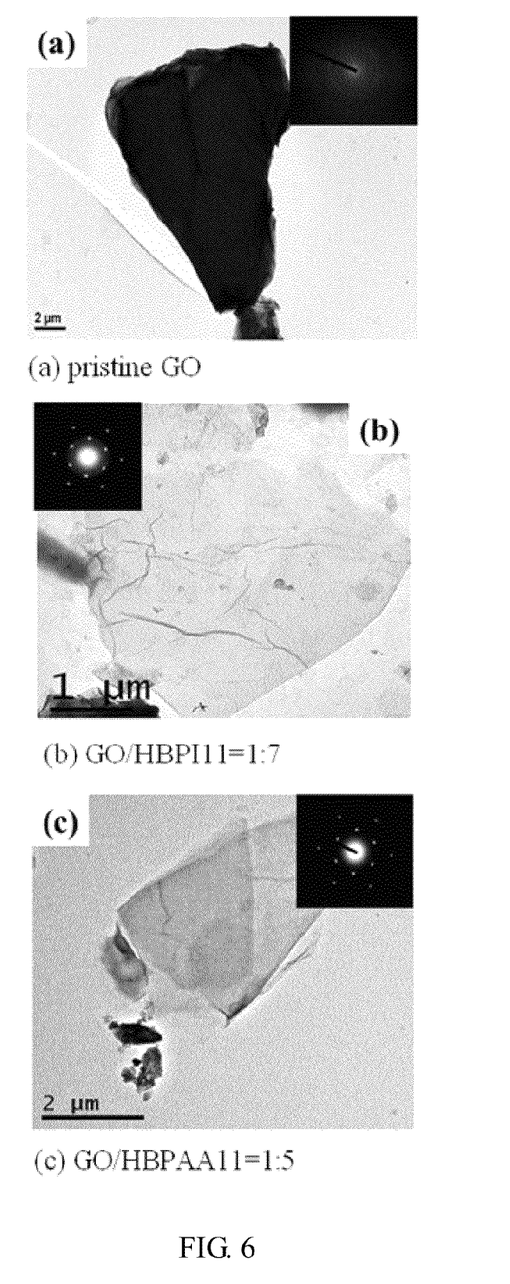
FIG. 6 shows TEM images of water-dispersible single-layered graphene oxides and their selected area electron diffraction (SAED) patterns.
Figure 7:
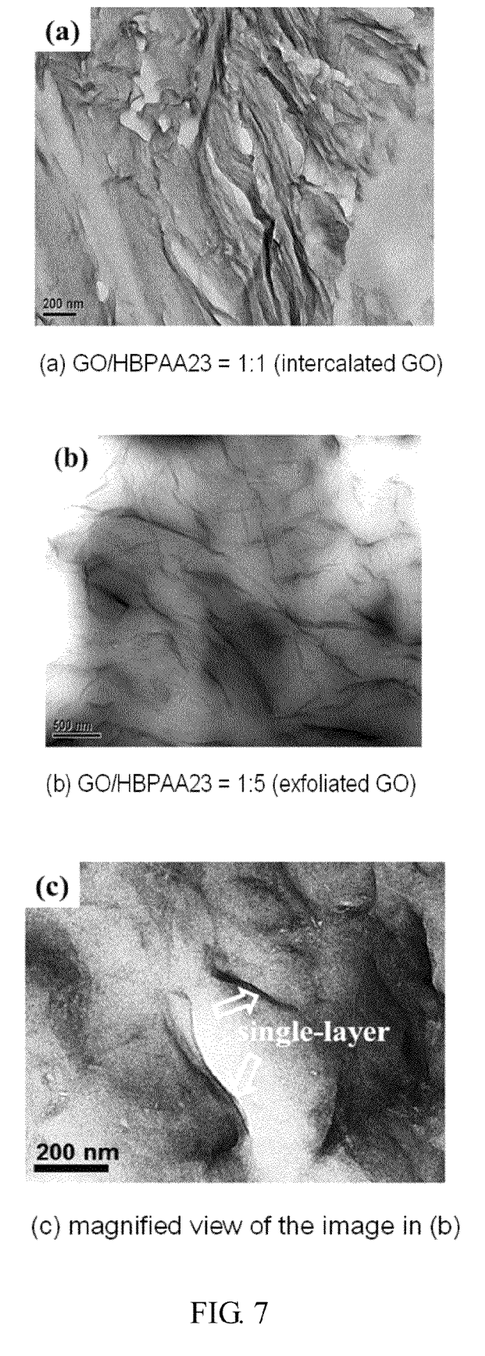
FIG. 7 shows TEM images for observing the single-layered graphene oxide embedded in epoxy resin.

FIG. 6 shows TEM images of water-dispersible single-layered graphene oxides and their electron diffraction (SAED) patterns, which supports that it is monolayered graphene material as shown in literatures (*ACS Nano.*, 2011, 5, 1253.; *Solid State Commun.* 2007, 143, 101.; and *ACS Nano.*, 2010, 4, 3169.) since clear hexagonal symmetry ring (1110) and hexagonal symmetry ring (2110). As shown in FIG. 7, the evidence of disordered exfoliated monolayered graphene oxide can be also obtained through the embedded-epoxy resin sections.

Figure 8:
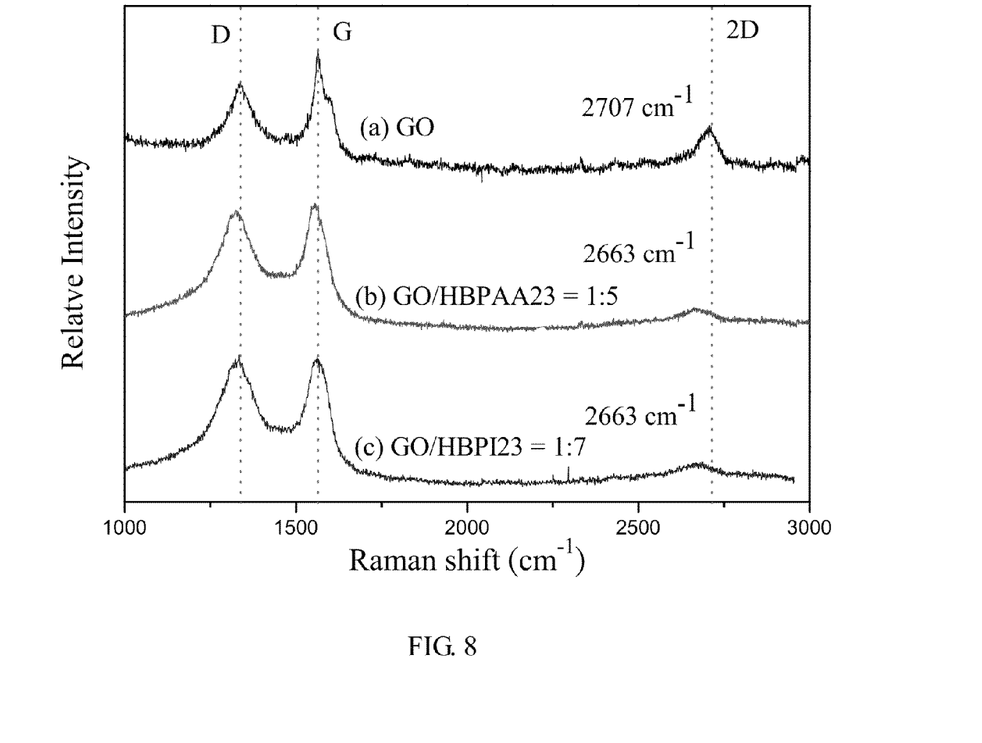
FIG. 8 is a Raman spectrum of the single-layered graphene oxide.

FIG. 8 is a Raman spectrum. The larger the $I_D/I_G$ is, the larger the structural imperfection forms. The intensity, shape and peak location of 2D peak around 2700 cm$^{-1}$ can be used to determine the number of layers of graphene. It can be found in the figure that 2D peak increases along with the molecular weight of hyperbranched polymer and 2D peak may shift. Literatures (*Chem. Rev.*, 2010, 110, 132.; *J. Mater. Chem.*, 2009, 19, 2457) prove that as the number of graphite layers is fewer, 2D peak shifts toward lower wavenumbers. This trend can also be observed in the spectrum.

The above description and examples are intended only to illustrate certain potential embodiments of this invention. It will be readily understood by those skilled in the art that the present invention is susceptible of a broad utility and applications. Many embodiments and adaptations of the present invention other than those herein described, as well as many variations, modifications and equivalent arrangements will be apparent from or reasonably suggested by the present invention and the forgoing description thereof without departing from the substance or scope of the present invention. Accordingly, while the present invention has been described herein in detail in relation to its preferred embodiment, it is to be understood that this disclosure is only illustrative and exemplary of the present invention and is made merely for purpose of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

What is claimed is:

1. A method for manufacturing a multi-functional, hyperbranched organic intercalating agent comprising synthesizing hydropholic triamine with polyoxyalkylene segmented chains and difunctional di-anhydride to form an $A_2B_3$ structure of hyperbranched polymeric intercalating agent with poly(amic acid) and polyimide,
   wherein the hydropholic triamine and the difunctional di-anhydride are synthesized at a temperature below room temperature;
   a total concentration of the hydropholic triamine and the difunctional di-anhydride in a solvent during synthesis is from 0.05 M to 0.09 M;
   before being synthesized with the bydropholic triamine, the difunctional di-anhydride is pretreated for lowering degree of hydrolysis and the pretreatment included thermal cylization or chemical imidization, and
   after the hydropholic triamine and the difunctional di-anhydride forming the intercalating agent, the intercalating agent being ionized and forming micelles in an aqueous phase.

2. The method as claimed in claim 1, wherein the hydropholic triamine is poly(oxypropylene)triamine represented by the following formula:

wherein a=4~5, 16~17 or 27~28;
the difunctional di-anhydride is selected from the group consisting of 4,4'-oxydiphthalic dianhydride (ODPA), pyromellitic dianhydride (PMDA), 3,3',4,4'-benzophenone tetracarboxilic dianhydride (BTDA), 3,3',4,4'-biphenyl tetracarboxylic dianhydride (BPDA) and hexafluoroisopropylidene diphthalic dianhydride (6FDA) while said 4,4'-oxydiphthalic dianhydride (ODPA) is represented by the following formula:

and
the molar ratio of the hydropholic triamine and the difunctional di-anhydride in the synthetic reaction is from 0.7:1 to 2:1.

3. The method as claimed in claim 1, wherein synthesizing the hydropholic triamine and difunctional di-anhydride is conducted in a solvent and the solvent is anhydrous N,N-dimethylacetamide (DMAc); and the method further comprises a step of removing the solvent after the synthesis and the step of removing the solvent includes using distillation at reduced pressure and then drying to obtain the $A_2B_3$ structure of hyperbranched polymeric intercalating agent that is hyperbranched poly(amic acid) (HBPAA) in orange color.

4. The method as claimed in claim 1, wherein synthesizing the hydropholic triamine and difunctional di-anhydride is conducted in a solvent and the solvent is anhydrous N,N-dimethylacetamide (DMAc); and the method further comprises a step of removing the solvent after the synthesis and the step of removing the solvent includes using thermal imidization followed by distillation at reduced pressure and drying to obtain the $A_2B_3$ structure of hyperbranched polymeric intercalating agent that is hyperbranched polyimide (HBPI) in dark yellow color.

5. A multi-functional, hyperbranched organic intercalating agent synthesized by reacting hydropholic triamine having polyoxyalkylene segmented chains with difunctional di-anhydride to form an $A_2B_3$ structure of hyperbranched polymeric intercalating agent with poly(amic acid) and polyimide, and the intercalating agent being ionized and forming micelles in an aqueous phase; the intercalating agent comprising:
   amine ($NH_2$) equivalents determined by amine titration, which are between 8.32 mequiv/g and 18.32 mequiv/g;
   GPC molecular weight ($M_w$) between 5000 g/mol and 7000 g/mol; and
   polydispersity index (PDI) between 2.0 and 3.8; and
   the intercalating agent in micelle form has particle size between 5 and 400.

6. A method for modifying a 2D layered material by using a multifunctional hyperbranched organic intercalating agent synthesized by reacting hydropholic triamine having polyoxyalkylene segmented chains with difunctional di-anhydride to form an $A_2B_3$ structure of hyperbranched polymeric intercalating agent with poly(amic acid) and polyimide, comprising neutralizing the intercalating agent with an inorganic acid or inorganic base leading to ionization to form an ionized amphiphilic hyperbranched organic polymer;

allowing the ionized amphiphilic hyperbranched organic polymer to form micelles in an aqueous phase; and mixing the ionized amphiphilic hyperbranched organic polymer and an untreated 2D layered material for intercalation to obtain a modified 2D layered material.

7. The method as claimed in claim 6, wherein said inorganic acid is hydrochloric acid, nitric acid, phosphoric acid or sulfuric acid;

said inorganic base is hydroxide or chloride of alkali metals or alkaline earth metals;

the molar ratio of the untreated 2D layered material and the ionized amphiphilic hyperbranched organic polymer is from 1:1 to 1:9;

the ionized amphiphilic hyperbranched organic polymer is mixed with the untreated 2D layered material in an aprotic polar hydrophilic co-solvent selected from the group consisting of N,N-dimethylacetamide (DMAc), dimethylfomamide (DMF), dimethylsulfoxide (DMSO) and 1-methyl-2-pyrrolidone (NMP); and the untreated 2D layered material is selected from the group consisting of graphite oxide, montmorillonite, mica, kaolinite, vermiculite and layered double hydroxides (LDHs).

8. The method as claimed in claim 7, wherein the untreated 2D layered material is graphite oxide obtained by oxidation of high purity graphite powders as raw materials according to the Hummers-Offeman method;

when the hyperbranched poly(amic acid) (HBPAA) intercalates the graphite oxide in a weight ratio of 1:3, the graphite oxide effectively achieves disordered exfoliation;

when the hyperbranched polyimide (HBPI) intercalates the graphite oxide in a weight ratio of 1:7, the graphite oxide effectively achieves disordered exfoliation.

9. A method of using the multifunctional hyperbranched organic intercalating agent as claimed in claim 1, comprising the use of the multifunctional hyperbranched organic intercalating agent in a nanocapsule, molecular self-assembly, drug carrier or drug tracer, wherein the multifunctional hyperbranched organic intercalating agent forms nanomicelles with particle size between 5 nm and 400 nm in acidic or alkaline conditions.

* * * * *